(12) United States Patent
de Lorimier et al.

(10) Patent No.: US 10,182,526 B1
(45) Date of Patent: *Jan. 22, 2019

(54) HARVESTING SYSTEM FOR HARVESTING STEMMED PLANTS HAVING ELONGATED STEMS AND INCLUDING BULBOUS GROWTH DISPOSED AT THE TOP OF THE STEMS

(71) Applicant: D'ARRIGO BROS CO. OF CALIFORNIA, Salinas, CA (US)

(72) Inventors: George Stephen de Lorimier, Salinas, CA (US); Peter F. de Groot, Carmel, CA (US); Ronald A. Bunch, Salinas, CA (US); Javier Rodriguez, Salinas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,289

(22) Filed: Jan. 30, 2018

Related U.S. Application Data

(63) Continuation of application No. 15/043,173, filed on Feb. 12, 2016, now Pat. No. 9,913,427.

(60) Provisional application No. 62/115,550, filed on Feb. 12, 2015.

(51) Int. Cl.
    *A01D 45/26*     (2006.01)

(52) U.S. Cl.
    CPC .................. *A01D 45/26* (2013.01)

(58) Field of Classification Search
    CPC ....... A01D 45/26; A01D 45/266; A01D 45/00
    USPC ........................................ 56/327.1
    See application file for complete search history.

(56) References Cited

U.S. PATENT DOCUMENTS

| | | | | |
|---|---|---|---|---|
| 3,586,108 | A | * | 6/1971 | Wedgeworth .......... A01D 45/00 171/32 |
| 3,690,049 | A | * | 9/1972 | Robertson .............. A01D 45/26 171/27 |
| 3,858,660 | A | * | 1/1975 | Wadsworth ............ A01D 45/26 171/57 |
| 5,207,277 | A | * | 5/1993 | Medlock .............. A01D 25/048 171/36 |
| 5,431,000 | A | * | 7/1995 | Shuknecht ............. A01D 34/18 460/143 |
| 5,799,474 | A | | 9/1998 | Ingram |
| 5,924,271 | A | | 7/1999 | Truffaux |
| 6,443,234 | B1 | | 9/2002 | Raymond |
| 6,857,257 | B2 | | 2/2005 | Angeleri |
| 8,136,335 | B2 | | 3/2012 | Dobson |

(Continued)

*Primary Examiner* — Thomas B Will
*Assistant Examiner* — Joan D Misa
(74) *Attorney, Agent, or Firm* — JRG Attorneys at Law

(57) ABSTRACT

A harvesting system for harvesting stemmed plants having elongated stems and including bulbous growth disposed at the top of the stems. The harvesting system includes a harvesting unit having a plurality of gripping elements; a cutter for harvesting the plants; and a divergent zone defined by gripping elements for vertically aligning the harvested plants. The harvesting unit further includes a transfer zone defined by gripping elements having another cutter for cutting the harvested plants to selected size, and includes a rotating brush for removing unwanted foliage from the harvested plants, a pair of belts disposed aft of the transfer zone for receiving selectably sized, harvested plants from the transfer zone and a belt-like table disposed aft of the pair of belts for receiving the selectably sized harvested plants from the pair of belts for packing and shipping the plants from the field.

18 Claims, 9 Drawing Sheets

(56) References Cited

U.S. PATENT DOCUMENTS

2005/0050875 A1     3/2005   Alsobrook
2009/0165433 A1     7/2009   Jauncey

* cited by examiner

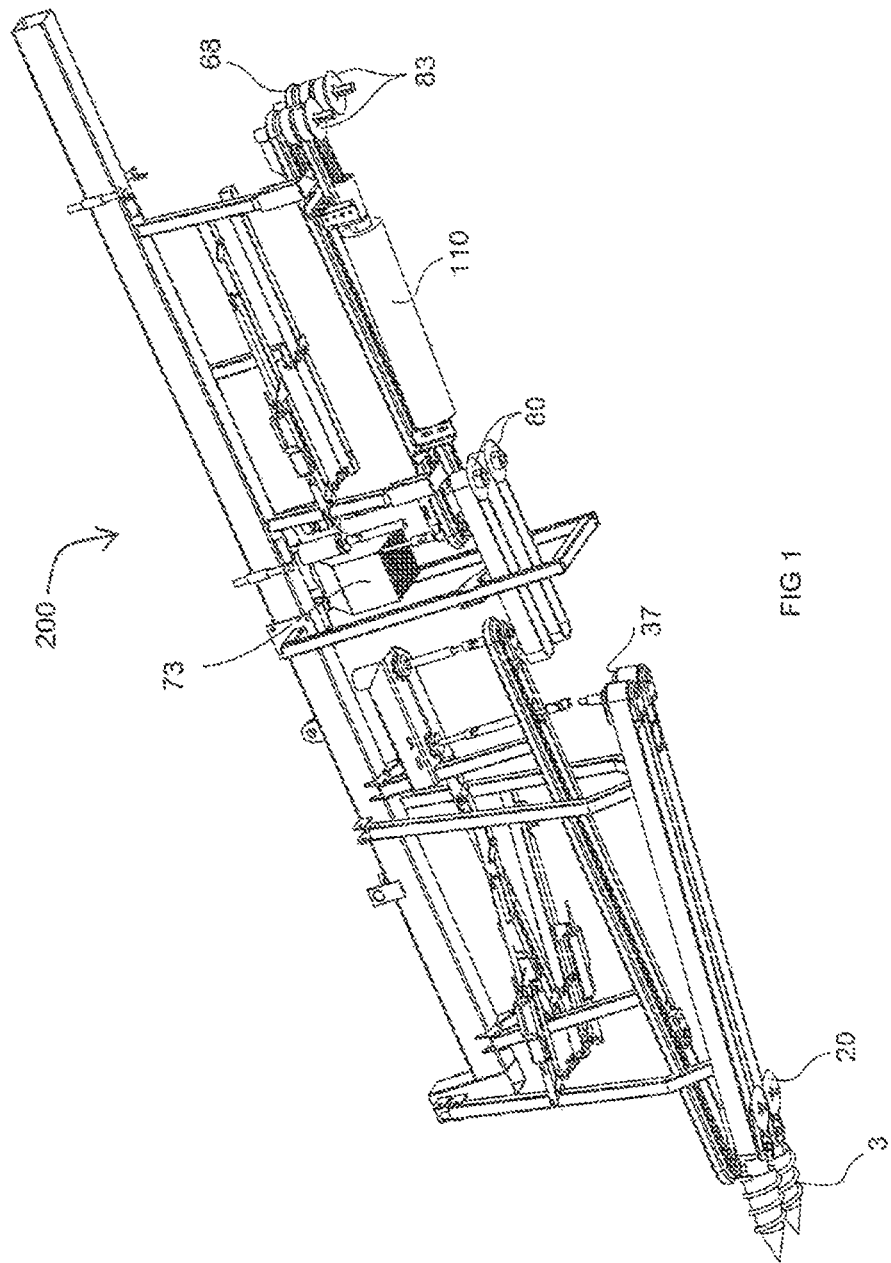

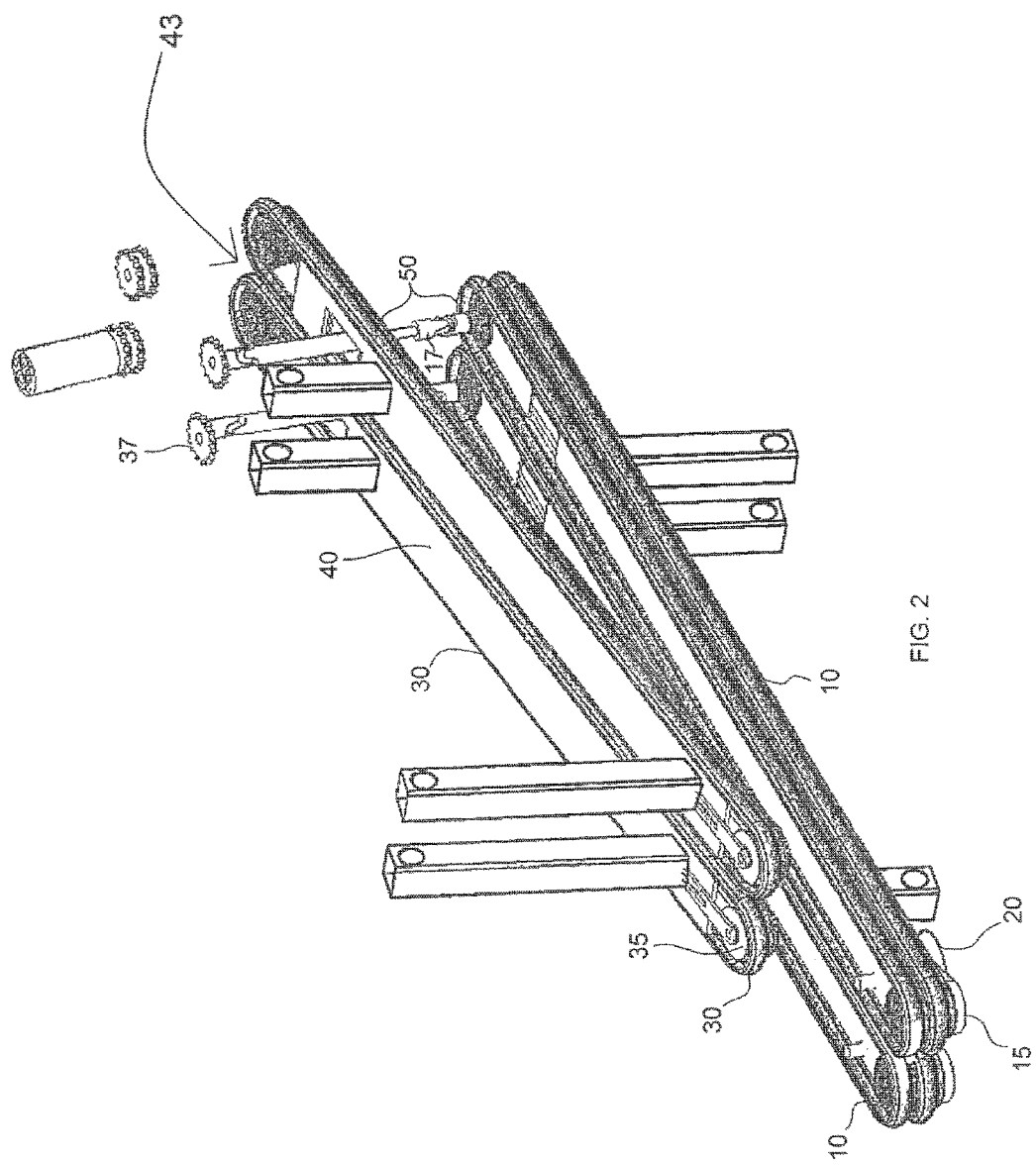

HARVESTING SYSTEM FOR HARVESTING STEMMED PLANTS HAVING ELONGATED STEMS AND INCLUDING BULBOUS GROWTH DISPOSED AT THE TOP OF THE STEMS

RELATED APPLICATION

This application is a continuation of pending U.S. patent application Ser. No. 15/043,137, Entitled: "Harvesting System for Harvesting Stemmed Plants having Elongated Stems and Including Bulbous Growth Disposed at the Top of the Stems", filed Feb. 12, 2016, which claims priority to U.S. Provisional Patent Application No. 62/115,550, entitled "Harvesting Apparatus for Harvesting Rapini or Similar Type Plants having Elongated Stems Including Florets Disposed at the Top of the Stems", filed on Feb. 12, 2015.

TECHNICAL FIELD

The invention relates generally to a harvesting apparatus suited for harvesting plants having elongated stems that include florets comprising any of the tight branched clusters of flower buds that together form the head of produce such as rapini, broccoli and the like, which are disposed at the top of the stem.

BACKGROUND OF THE INVENTION

In general, harvesting of produce, including in particular vegetables such as rapini and other similar type vegetables, involves the manual removal of produce from the field. Usually, a farmworker walks through a field with a cutting tool such as a harvesting knife and manually detaches the exposed produce from its root. The produce is then delivered for further processing, perhaps to a conveyor belt on a self-propelled harvester travelling through the field alongside the worker.

There are drawbacks with the prior art methods, however. They are very labor-intensive, often requiring more workers than are readily available when the plants are ready for harvest. In addition, because of the use of sharp cutting implements used by workers, there is a risk of injury. A need therefore exists to reduce the labor-intensity of the produce harvesting process, to make that process safer and more cost effective. Preferably, account should also be taken of other steps necessary in the harvesting process beyond the removal of the produce from the ground, including inspection, packaging and packing for distribution to the marketplace directly from the field. The present invention satisfies all of the objectives and provides other related advantages such as cutting the rapini or similar type plants into even lengths for convenient packing and shipping, and for enhanced presentation at retail outlets.

BRIEF SUMMARY OF THE INVENTION

One aspect of the present invention is to provide a harvesting apparatus for harvesting rapini or similar type plants having elongated stems that include florets disposed at the top of the stems. Moreover, one of the primary goals of the harvesting apparatus is to provide rapini or similar type plants harvested with even lengths for packing and shipping with desired appearance in the marketplace.

Another aspect of the present invention is to provide a harvesting apparatus that reduces the need for manual labor, especially when the plants are prime for harvest.

In another aspect of the present invention the harvesting apparatus comprises a first gripping element for gripping the plants as the apparatus advances forward through a row of unharvested plants, the first gripping element comprising opposed belts disposed adjacent one another and being driven by forward and aft spindles along a first track. The harvesting apparatus also includes a first pair of cutters coupled to the bottom of the forward spindles of the opposed belts of the first gripping element for cutting the stems of the plants below the florets.

One aspect of the invention includes a second gripping element having opposed belts arranged in similar fashion to the first gripping element disposed at an acute angle directly above and aligned with the first gripping element for defining a divergent zone along the first track, and for receiving, gripping and transporting the harvested plants from the first gripping element.

The gripping force of the second gripping element on the plant stem is less than the corresponding force of the first gripping element. Thus, as the first and second gripping elements transport harvested plants along the first track, the acute angle of the divergent zone causes the first gripping element to pull the plants vertically downward with respect to the second gripping element until the bottom of the floret contacts the top of the second gripping element. This arrangement of grippers provides substantially uniform vertical alignment of the plants while traveling along the first track for further processing downstream.

Another aspect of the invention, includes a third gripping element having opposed belts disposed in similar fashion to the first gripping element mounted near the aft end of the second gripping element and having forward and aft drive spindles for receiving, gripping and transporting the harvested plants along the first track. In addition, the invention includes a blower for blowing air over the plants to spread out the excess foliage on the stems for later removal downstream.

Optionally, the present invention includes a second pair of cutters coupled to the bottom of the aft spindles of the third gripping element for trimming excess stems and foliage off the plants.

The harvesting apparatus of the present invention also includes a fourth gripping element of design similar to that of the first, second and third gripping elements, mounted near the aft end of the third gripping element for receiving the plants from the third gripping element and advancing the plants along the first track, and for defining a transfer zone. The transfer zone also includes at least one spinning brush disposed near the bottom of the fourth gripping element for removing unwanted foliage from the plants and a third pair of cutters coupled to the bottom of the aft spindle of the fourth gripping element for cutting the plants to substantially uniform length for packaging, packing and shipping size. The gripping force of the fourth gripping element on the plant stem is less than the corresponding force of the first and third gripping element. Finally, the transfer zone further includes a pair of twisted belts for receiving and rotating the substantially uniformly cut plants approximately 90 degrees for transfer to a packaging and packing station.

Another embodiment of the present invention includes a second track comprising the elements of the first track disposed on a chassis in parallel with the first track for harvesting plants growing in parallel rows at a preselected distance apart. In a further embodiment, the present invention can be used in sets of three, four, five, six, seven, eight or other configuration as convenient for any given planting and harvesting requirement. Each such additional track includes the elements of the first track, and is typically mounted on a single chassis for harvesting plants growing in parallel rows at preselected distances apart.

An additional embodiment of the invention includes harvesting alignment guides located at or near the bottom of the first gripping element. The alignment guides help to keep the harvesting apparatus properly lined up with the exact row of plants to be harvested as the apparatus advances forward.

Another embodiment of the invention further includes at least two helix-like guides located at or near the bottom of the first gripping element. As the harvesting apparatus advances forward, the helix-like guides help to lift up the stocks/stems of plants that are bent or leaning over in a non-vertical position due to wind or other conditions that may have pushed them down.

Another embodiment of the invention additionally includes a height adjustment controller for allowing a field operator to adjust the height of the first gripping element. As the harvesting apparatus advances forward, the field operator manually adjusts the height of the first gripping element so that the stems of the plants are gripped approximately 10" below the height of the florets.

Another embodiment of the invention further includes an onboard water tank. The onboard water is used to keep all the pinch belts wet. Thus, the harvesting apparatus also includes water nozzles that are operated by a water spray controller for spraying water on the opposed pinch belts to keep them wet or moist during the harvesting process.

A further aspect of the present invention is to provide a method for harvesting rapini or similar type plants having elongated stems that include florets disposed at the top of the stems. The method comprising the steps of gripping the plants with a first gripping element as a harvesting apparatus advances forward through a row of unharvested plants; cutting the plants along the stems below the florets with a first pair of cutters; receiving, gripping and transporting the harvested plants along a second gripping element; defining a divergent zone, the second gripping element being disposed at an acute angle above the first gripping element, wherein the acute angle causing the first gripping element to pull the plants vertically downward with respect to the second gripping element until the bottom of the florets contact the top of the second gripping element, thereby enabling substantial vertical alignment of the plants; receiving, gripping and transporting the harvested plants along a third gripping element; blowing air over the plants to spread out the excess foliage on the stems for removal downstream; receiving, gripping and advancing the plants along a fourth gripping element for defining a transfer zone; removing unwanted foliage from the plants with at least one spinning brush disposed near the bottom of the fourth gripping element; and cutting the plants with a third pair of cutters to substantially uniform length for packaging, packing and shipping size.

Another aspect of the present invention is to provide an apparatus for harvesting rapini or similar type plants having elongated stems that include florets disposed at the top of the stems comprising a first gripping element for gripping the plants as the apparatus advances forward through a row of unharvested plants, said first gripping element being driven by forward and aft spindles; a first pair of cutters coupled to spindles disposed at the bottom of the forward spindle of the first gripping element for cutting the plants along the stems below the florets; a second gripping element for receiving and transporting the harvested plants received from the first gripping element, wherein the second gripping element having a predetermined gap disposed in the middle thereof, thereby enabling the plants to slide vertically downward; and the second gripping element being disposed at an acute angle directly above and aligned with the first gripping element for defining a divergent zone between the first gripping element, wherein the acute angle of the divergent zone causing the first gripping element to pull the plants vertically downward with respect to the second gripping element until the bottom of the florets contact the top of the second gripping element, thereby enabling substantial uniform vertical alignment of the plants.

Consequently, for a better understanding of the present invention, its functional advantages and the specific objects attained by its uses, reference should be made to the accompanying drawings, claims and descriptive matter in which there are illustrated preferred embodiments of the invention.

BRIEF DESCRIPTION OF THE DRAWINGS

FIG. 1 is a side perspective view and a partial bottom view of the harvesting apparatus.

FIG. 2 is a front perspective view of the first gripping element and the second gripping element defining a divergent zone.

DETAILED DESCRIPTION OF THE INVENTION

The following detailed description is of the best currently contemplated modes of carrying out exemplary embodiments of the invention. The description is not to be taken in a limiting sense, but is made for at least the purpose of illustrating the general principles of the invention, since the scope of the invention is best defined by the appended claims.

The present invention is an apparatus used for harvesting rapini or similar type plants having elongated stems containing florets disposed at the top of the stems. One of the main goals of the harvesting apparatus is to provide rapini or similar type plants harvested with even lengths for packing and shipping. Additionally, the apparatus can be self-powered or towed by a tractor which is not illustrated or described herein since tractors come in a large variety of configurations and are common farm equipment.

Figure 4A:
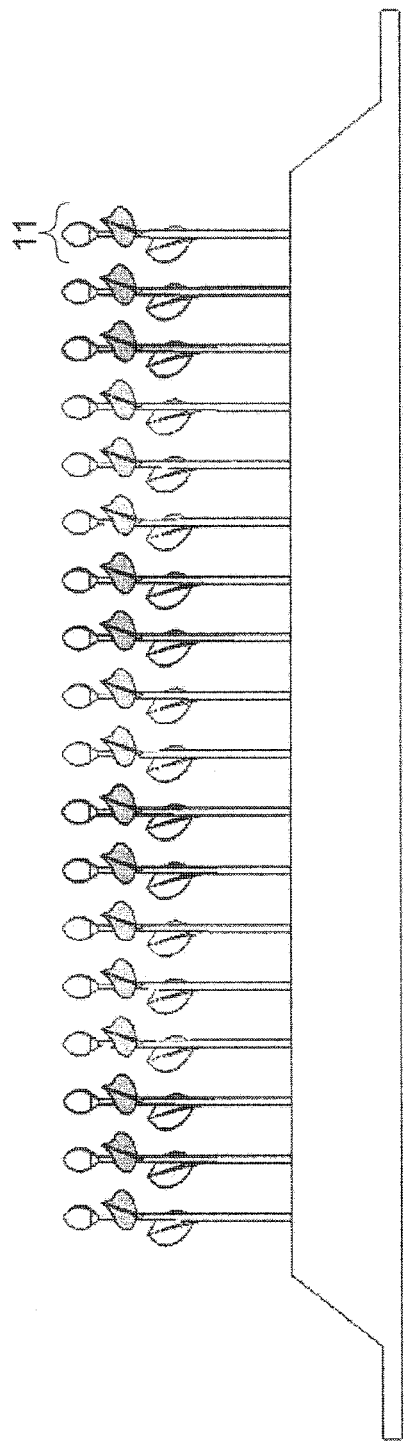
FIG. 4a represents a picture of unharvested rapini plants.
Figure 4B:
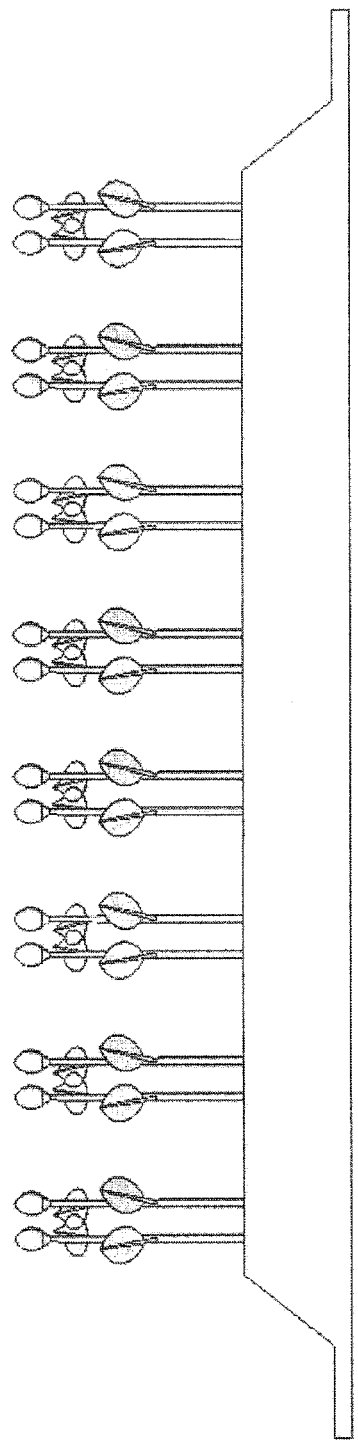
FIG. 4b represents another picture of unharvested rapini plants.

Referring now to the drawings, FIGS. 1-2 refer to one embodiment of a harvesting apparatus 200 for harvesting rapini type plants. The harvesting apparatus 200 includes a first gripping element 10 for gripping the plants as the apparatus 200 advances forward through a row of unharvested plants 11 as illustrated in FIGS. 4a and 4b. To be more specific, the plants vary in height, ranging from approximately 36" to 48" tall during harvest season. In addition, the first gripping element 10 is driven by forward 15 and aft 17 spindles along a first track 40. Furthermore, the first gripping element 10 includes a pair of opposed pinch belts being adjacent to one another for gripping the plants in between thereof with pressure as the apparatus advances forward through a row of the unharvested plants.

Referring still to FIGS. 1-2, the apparatus 200 also includes a first pair of cutters 20 coupled to spindles located at the bottom of the forward spindle 15 of the first gripping element 10 used for cutting the plants approximately 10" below the florets. A second gripping element 30 is included for receiving, transporting and registering the harvested plants 12, along the first track 40. The second gripping element 30 is located at an acute angle above the first gripping element 10 for defining a divergent zone 50 between the first gripping element 10 and the second gripping element 30. The second gripping element 30 also includes a pair of opposed pinch belts being driven by forward 35 and aft 37 spindles.

Referring still to FIGS. 1-2, the second gripping element 30 has a predetermined gap 43 located in the middle thereof for allowing the plants to slide vertically downward to allow the florets and the associated foliage to rest on the top of the second gripping element 30. The gap 43 can be adjusted by a field operator with respect to the size of the plant stems to be harvested. Further, the first gripping element 10 and the second gripping element 30 work in cooperation for defining the divergent zone 50, where the first gripping element 10 squeezes the stems of the plants between the pinch belts more firmly than the second gripping element 30. The second gripping element 30 generally does not provide an initial force between the pinch belts due to the predetermined gap 43.

The plants are received, gripped and initially transported along the first gripping element 10 until the florets and associated foliage reach the second gripping element 30. The florets and the associated foliage are wider than the gap 43, allowing the florets to rest on the top of the second gripping element 30, causing the rubber of the pinch belts to deform increasing the gripping force on the second gripping element. The force of the second gripping element dominates, and the stems of the plants start to slip out of the first gripping element 10 as the first and second gripping elements advance forward.

Figure 3A:
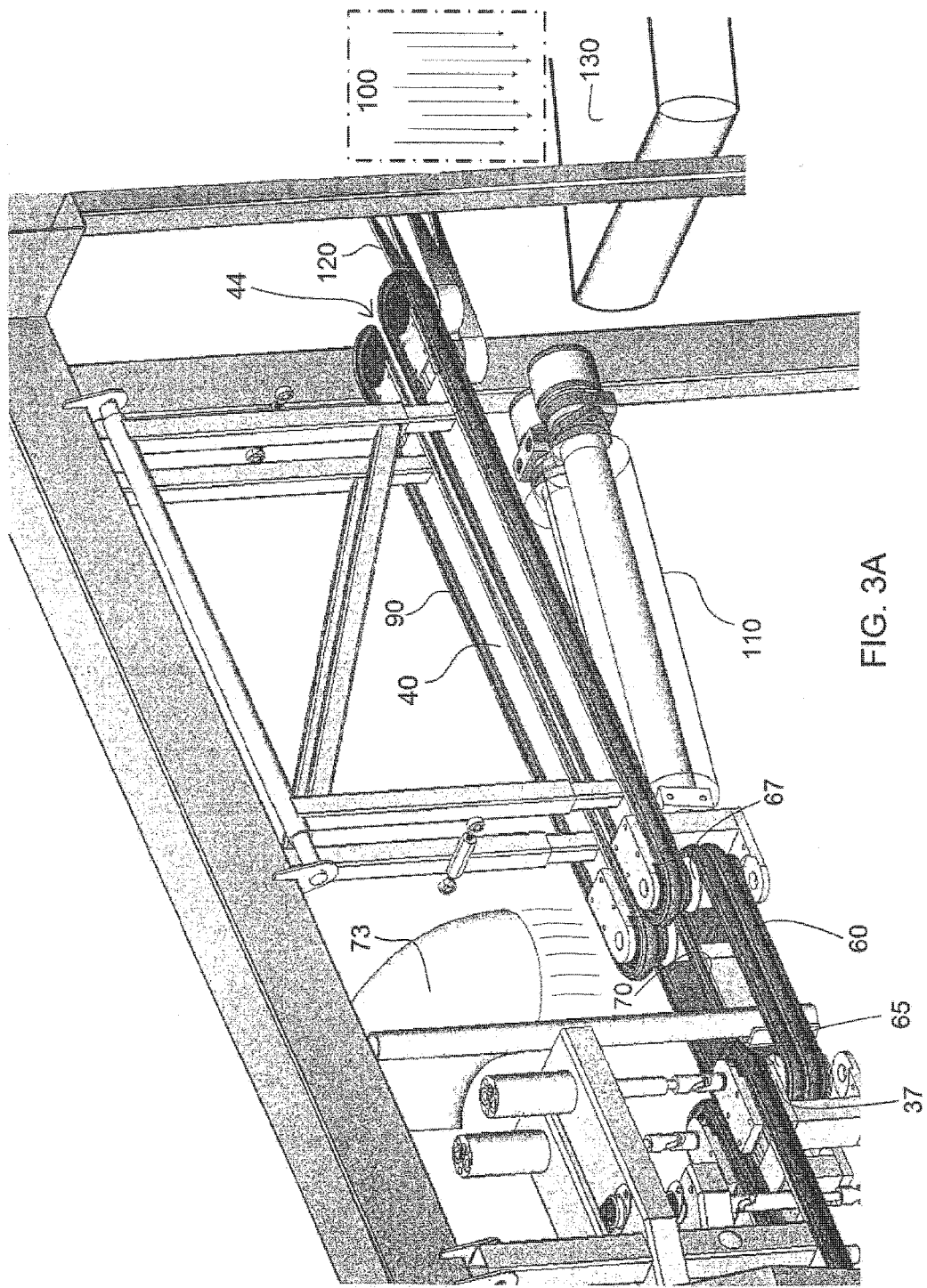
FIG. 3a is a zoomed in perspective view showing the third gripping element, the fourth gripping element including at least one spinning brush located at the bottom thereof, and the slow moving conveyor belt-like table.

Referring now to FIGS. 1 and 3(a), an exemplary embodiment of the present invention includes a third gripping element 60 that is mounted near the aft end 37 of the second gripping element 30 and having forward 65 and aft spindles 67 for receiving, gripping and transporting the harvested plants 12 along the first track. Also, the third gripping element 30 includes a pair of opposed pinch belts that hold the plants in between thereof for gripping the plants with pressure as the apparatus advances forward. Also, one embodiment of the invention includes an air blower 73 disposed directly above the third gripping element 60 for blowing air over the plants as depicted in FIGS. 1 and 3(a) for spreading out the excess foliage on the stems of the plants for removal downstream. Likewise, the harvesting apparatus 200 may include an optional pair of second cutters 80 coupled to the bottom of the aft spindle 67 of the third gripping element 60 as illustrated in FIG. 1, which are used for trimming excess foliage off the plants.

Figure 3B:
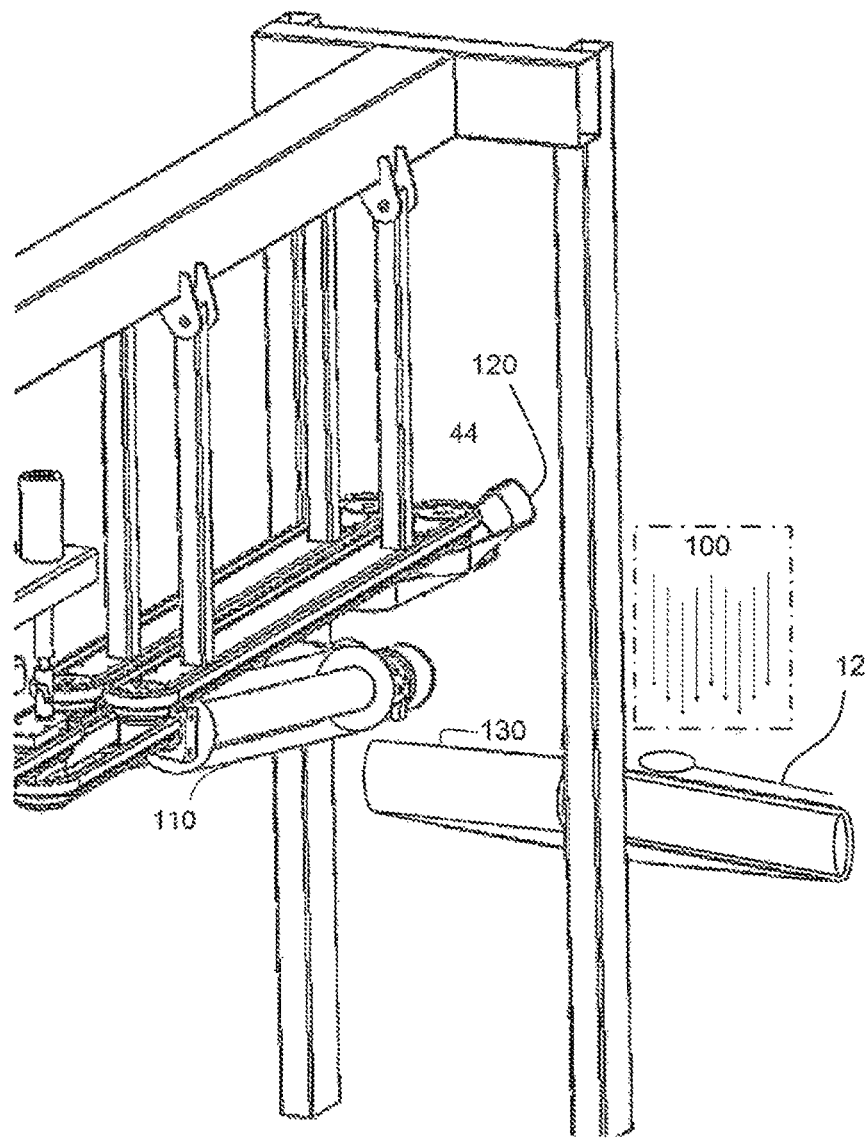
FIG. 3b is a zoomed in perspective view showing the fifth gripping element, and the slow moving conveyor belt-like table.

As shown in FIGS. 1 and 3(b), the preferred embodiment of the invention is also comprised of a fourth gripping element 90 mounted near the aft end 67 of the third gripping element 60 for receiving and advancing the plants along the first track 40 and for defining a transfer zone 100 as illustrated in FIG. 3(b). Similarly, the fourth gripping element 90 includes a pair of opposed pinch belts that are driven by forward 67 and aft spindles 68. Further, the fourth gripping element 90 also includes a predetermined gap 44 located in the middle thereof for allowing the florets and the associated foliage to rest on the top of the fourth gripping element 90 as illustrated in FIG. 3(b). The gap 44 can be adjusted by a field operator with respect to the size of the plant stems to be harvested.

Another embodiment of the invention is also comprised of at least one spinning brush 110 located near the bottom of the fourth gripping element 90 as illustrated in FIGS. 1, 3(a) and 3(b). The spinning brushes 110 are used for removal of unwanted foliage from the plants as the fourth gripping element 90 advances forward with the plants being disposed on the first track 40. Similarly, the harvesting apparatus 200 includes a pair of third cutters 83 coupled to the bottom of the aft spindle 68 of the fourth gripping element 90 disposed near the transfer zone 100 as illustrated in FIG. 1, which are used for cutting the plants to substantially uniform length for packaging, packing and shipping size.

As illustrated in FIG. 3(b), one embodiment of the invention includes a slow moving conveyor belt-like table 130. In addition, another embodiment of the invention includes a fifth pair of belts 120 that have a 90 degree twist to them for rotating the plants and transporting them to the packaging and packing station comprising the slow moving belt-like table 130.

The transfer zone 100 is located substantially at the end of the fourth gripping element 90 as depicted in FIG. 3(b). As the plants advance forward along the first track 40, they are transported to the fifth pair of belts 120, which rotate the harvested plants 12 approximately 90 degrees from a substantially vertical orientation to a substantially horizontal orientation for delivery to the belt-like table 130 for packaging and packing for shipping. As the plants advance forward on the belt-like table 130, field workers bundle the harvested plants 12 into a bunch (about 25 plants), tie them together and place the bunches into a carton for shipping. The cartons used for shipping contain about 20 bunches weighing about 18-22 pounds. Lastly, all the spindles/cutters are powered by an onboard motor.

Figure 5:
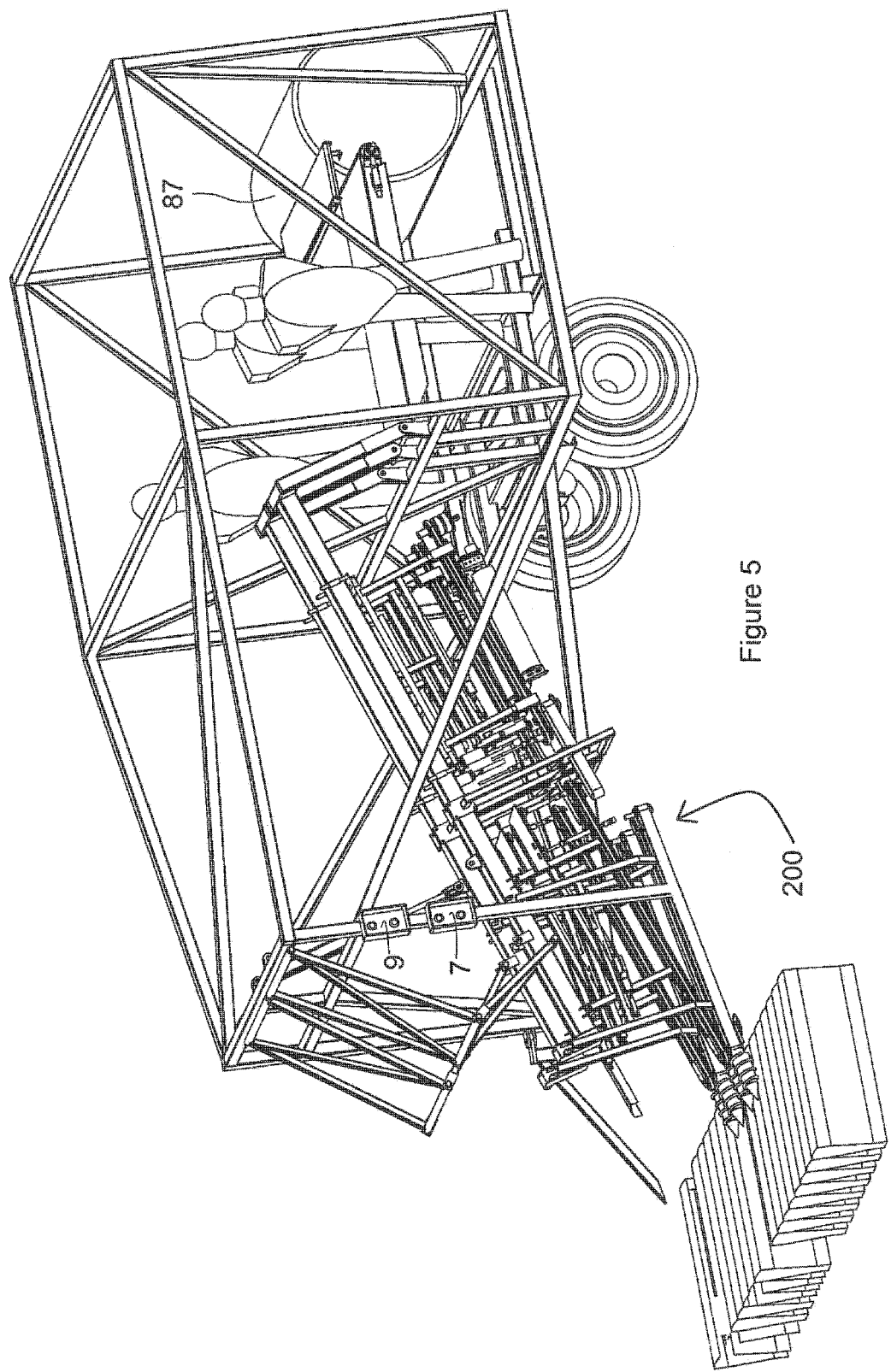
FIG. 5 is a front perspective view of the harvesting apparatuses in use.
Figure 6:
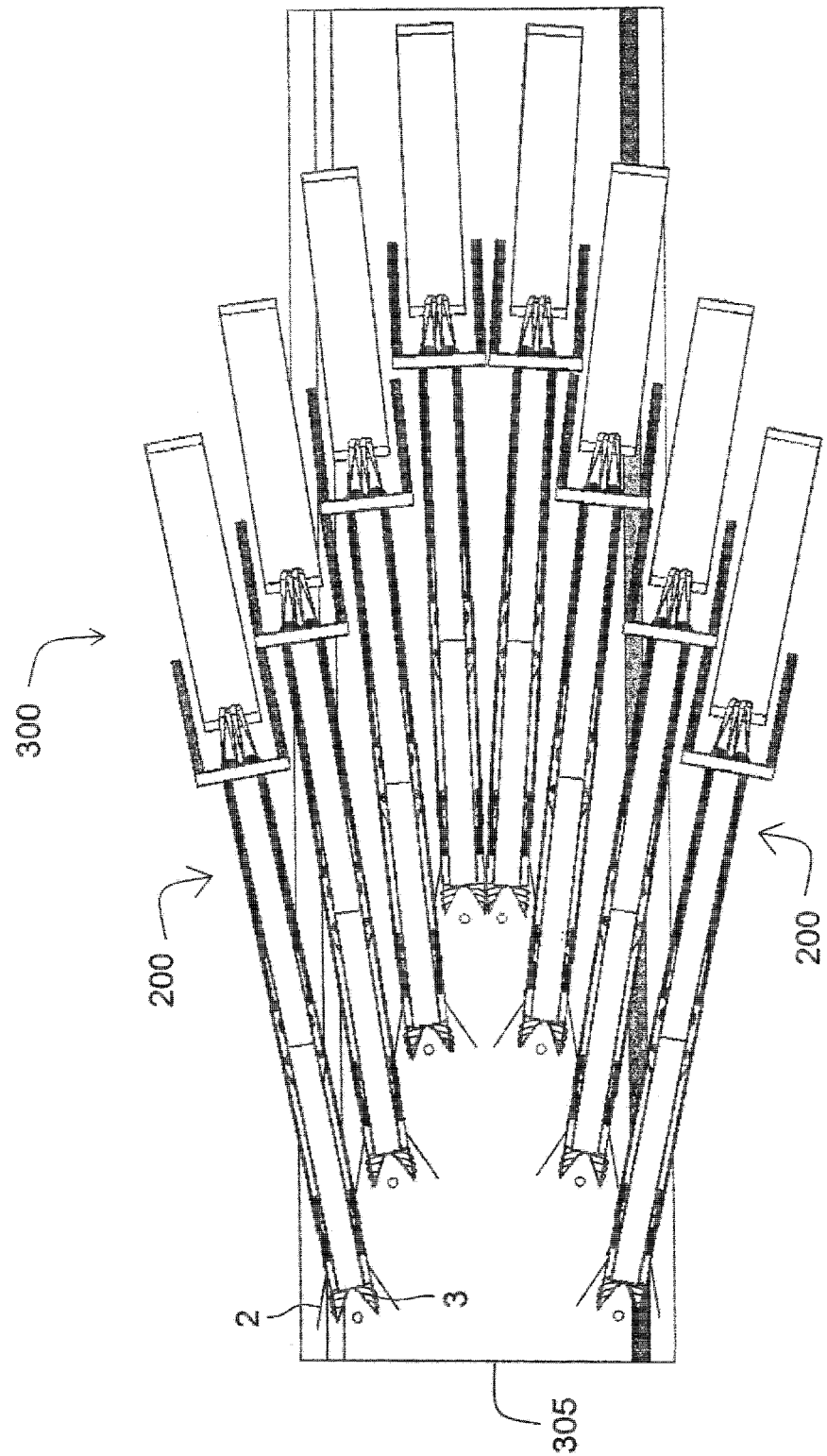
FIG. 6 is a top perspective view of the harvesting apparatuses configured into a harvesting unit for use condition.

Referring now to FIGS. 5 and 6, one embodiment of the invention includes harvesting alignment guides 2 located at or near the bottom of the first gripping element 10. The alignment guides 2 help to keep the harvesting apparatus 200 properly lined up with the exact row of plants to be harvested as the apparatus advances forward. The alignment guides are powered by an onboard motor.

Referring still to FIGS. 1, 5 and 6, one embodiment of the invention includes at least two helix-like guides 3 located at or near the bottom of the first gripping element 10. As the harvesting apparatus advances forward, the helix guides 3 help to lift up the stocks/stems of plants that are bent or leaning over in a non-vertical position due to wind that has pushed them down. The helix-like guides are powered by an onboard motor.

As shown in FIG. 5, one embodiment of the invention includes a height adjustment controller 7 for allowing a field operator to adjust the height of the first gripping element 10. As the harvesting apparatus advances forward, the field operator manually adjusts the height of the first gripping 10 element so that the plants are gripped substantially below the height of the florets. The field operator adjusts the height of the first gripping element 10 since the height of the plants range between 36" to 48" tall during harvest season. The manual height adjuster controller is powered by an onboard motor.

As further shown in FIG. 5, one embodiment of the invention includes an on board water tank 87. The on board water tank 87 is used to keep the pinch belts wet. For example, the harvesting apparatus 200 includes water nozzles that are manually operated by a water spray controller 9 used to spray water on all the pinch belts that are used for forming the gripping elements in order to keep them wet or moist. The water spray controller is powered by an onboard motor.

As shown in FIG. 6, one embodiment of the invention includes a plurality of the harvesting apparatuses 200 mounted to a frame 305, which comprises a harvesting unit 300. In effect, the unit 300 can be used in sets of two, three, four, five, six, seven, eight or other configuration as convenient for any given harvesting requirement. Similarly, the harvesting apparatus 200 or the harvesting unit 300 can be towed by a tractor which is not illustrated or described herein since tractors come in a large variety of configurations and are common farm equipment.

Figure 7:
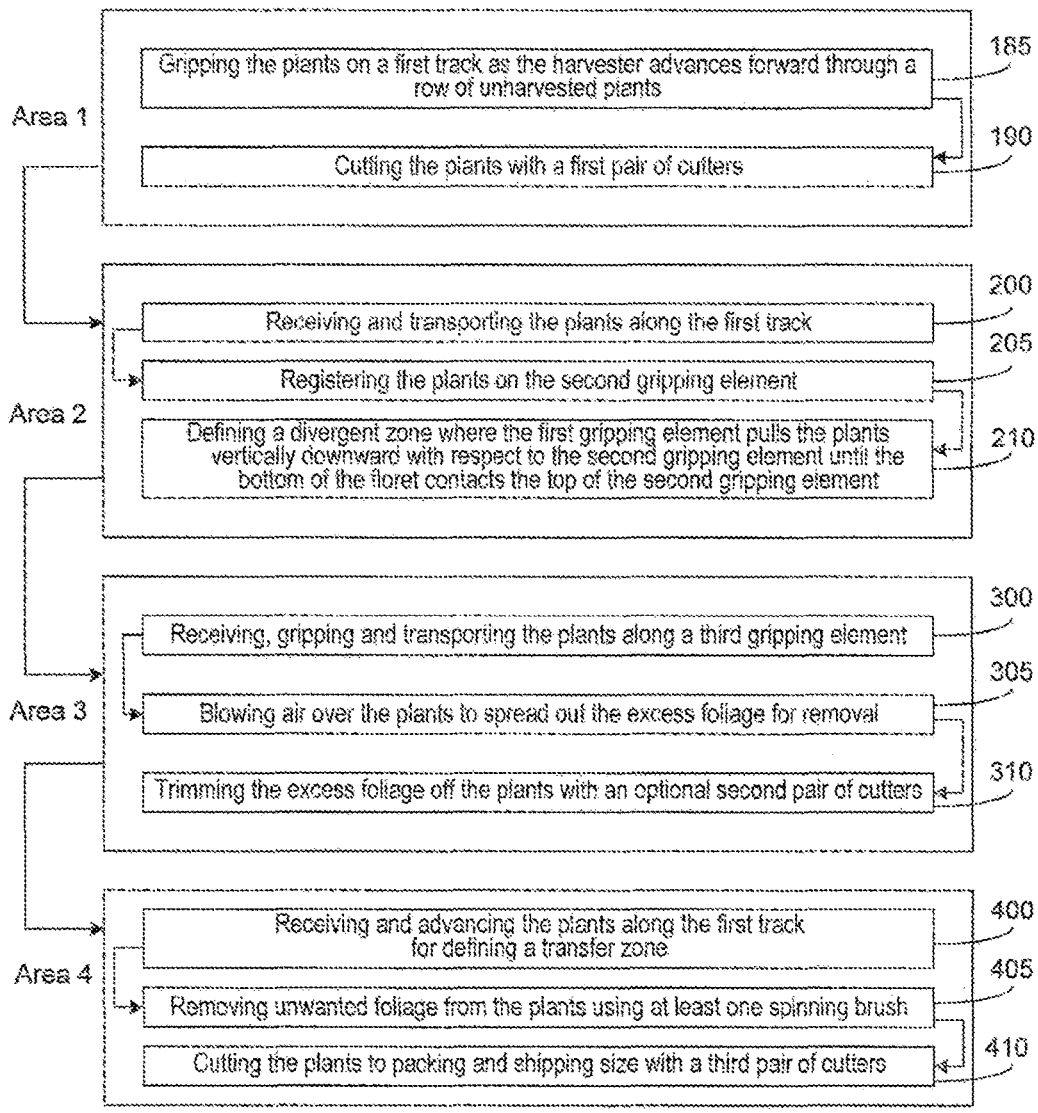
FIG. 7 represents an execution diagram for the method of harvesting rapini or similar type plants having elongated stems containing florets disposed at the top of the stems.

FIG. 7 represents an execution diagram for the method of harvesting rapini or similar type plants having an elongated stem that includes a floret disposed at the top of the stem. In area 1, the method comprises the step of gripping the plants 185 as a harvesting apparatus advances forward through a row of unharvested plants and then cutting the plants 190 along the stems below the florets with a first pair of cutters.

In area 2, the method comprises the step of receiving and transporting the harvested plants along the second gripping element 30 for registering the plants 205, and for defining a divergent zone 210 where the first gripping element pulls the plants vertically downward with respect to the second gripping element until the bottom of the floret contacts the top of the second gripping element. In area 3, the method comprises the step of receiving, gripping and transporting the plants 300 along a third gripping element, blowing air over the plants 305 to spread out the excess foliage on the stems for removal downstream, and trimming off the excess foliage 310 with an optional second pair of cutters.

In area 4, the method comprises the step of receiving and advancing the plants 400 along the first track and for defining a transfer zone, removing unwanted foliage from the plants 405 with at least one spinning brush disposed near the bottom of the fourth gripping element, and cutting the plants 410 to packing and shipping size.

Figure 8:
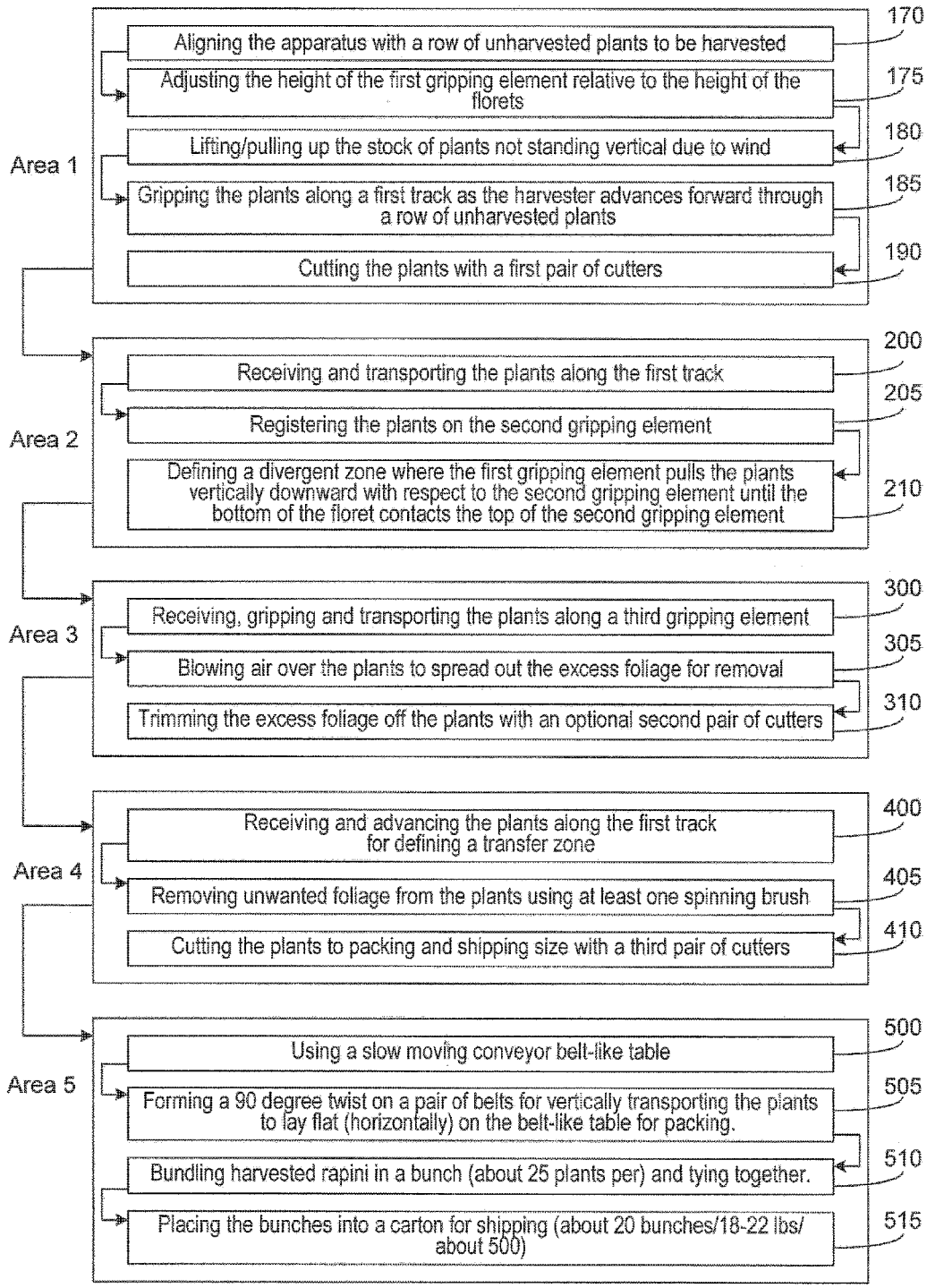
FIG. 8 represents a complete and detailed listing of the execution diagram for the method of harvesting rapini or similar type plants having elongated stems containing florets disposed at the top of the stems.

FIG. 8 represents a complete and detailed listing of the execution diagram for the method of harvesting rapini or similar type plants having elongated stems that include florets disposed at the top of the stems.

It should be understood that the foregoing relates to exemplary embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

What is claimed is:

1. A harvesting system for harvesting stemmed plants having elongated stems and including bulbous growth disposed at the top of the stems, said system having a harvesting unit comprising:
   a first pair of gripping elements;
   a first cutter for cutting the stems of the plants;
   a divergent zone defined by a second pair of gripping elements, disposed at an acute angle above the first pair of gripping elements for vertically aligning the harvested plants;
   a third pair of gripping elements disposed directly beneath an air blower and configured to receive and transport the harvested plants past the air blower for allowing directed air to blow over the plants to spread out excess foliage on the stems; and
   a transfer zone defined by a fourth pair of gripping elements including a rotating brush for removing unwanted foliage from the harvested plants.

2. The harvesting system according to claim 1, wherein the divergent zone is further defined by:
   the first pair of gripping elements configured to grip the stems of the plants as the harvesting system advances forward through a row of unharvested plants, said first pair of gripping elements being driven by forward and aft spindles.

3. The harvesting system according to claim 2, wherein the divergent zone is further defined by:
   the second pair of gripping elements, disposed at an acute angle directly above and aligned with the first pair of gripping elements for receiving and transporting the harvested plants from the first pair of gripping elements into the divergent zone, whereby the acute angle of the divergent zone causes the first pair of gripping elements to pull the plants vertically downward with respect to the second pair of gripping elements until the bottom of the bulbous growth contacts the top of the second pair of gripping elements, thereby enabling substantially uniform vertical alignment of the plants.

4. The harvesting system according to claim 3, wherein the divergent zone is further defined by:
   the forward spindle of the first pair of gripping elements include the first cutter coupled to the bottom of the forward spindle of the first pair of gripping elements for cutting the stems of the plants at a predetermined length below the bulbous growth.

5. The harvesting system according to claim 4 further comprising:
   the third pair of gripping elements being mounted near the aft end of the second pair of gripping elements and having forward and aft spindles, and the fourth pair of gripping elements being mounted near the aft end of the third pair of gripping elements to define the transfer zone, said third and fourth gripping elements configured to receive harvested plants from the second pair of gripping elements for transporting the harvested plants through the transfer zone.

6. The harvesting system according to claim 5, wherein the first cutter is a pair of counter rotating blades and wherein the transfer zone further includes at least one spinning brush for removing the unwanted foliage from the plants.

7. The harvesting system according to claim 5 further comprising:
   a third pair of cutters coupled to the bottom of the aft spindle of the fourth pair of gripping elements disposed near the transfer zone for cutting the plants to substantially uniform length for packaging, packing and shipping size.

8. The harvesting system according to claim 5, wherein the blower is disposed directly above the third pair of gripping elements for blowing air over the plants to spread out the excess foliage on the stems for removal downstream.

9. The harvesting system according to claim 4, wherein the first pair of gripping elements includes at least one harvesting guide disposed at or near the front of the first pair of gripping elements that keeps the harvesting system properly aligned with the desired row of plants to be harvested as the apparatus advances forward along the row.

10. The harvesting system according to claim 4, wherein the predetermined length for cutting the plants below the bulbous growth is approximately 10 inches.

11. The harvesting system according to claim 1, wherein a second pair of cutters are coupled to the bottom of the aft spindle of the third pair of gripping elements for cutting the harvested plants to selected size.

12. The harvesting system according to claim 1, wherein the first, second, third and fourth pair of gripping elements include a pair of opposed pinch belts disposed adjacent to one another.

13. The harvesting system according to claim 12, wherein the second pair of gripping elements includes a first predetermined gap and the fourth pair of gripping elements includes a second predetermined gap for allowing the bulbous growth to rest on the top of the second and fourth pair of gripping elements.

14. The harvesting system as in claim 1 further including:
a slow-moving conveyor belt-like table; and
a pair of belts, disposed aft of the transfer zone, cooperating to provide a 90 degree twist for transporting the plants to the belt-like table in a horizontal position for packing.

15. The harvesting system according to claim 1, wherein the first pair of gripping elements includes at least two helix-like guides disposed at or near the front of the first pair of gripping elements for lifting up the plants that are bent or leaning over in a non-vertical position due to wind that has pushed them down.

16. The harvesting system according to claim 1 further including a plurality of harvesting units for simultaneously harvesting a plurality of rows of stemmed plants.

17. The harvesting system according to claim 16, wherein the harvesting units are disposed in sets of two, three, four, five, six, seven, or eight.

18. The harvesting system according to claim 1, wherein the stemmed plants are rapini or similar type plants.

* * * * *